United States Patent
Noda et al.

(10) Patent No.: US 7,198,040 B2
(45) Date of Patent: Apr. 3, 2007

(54) INTAKE DEVICE OF INTERNAL COMBUSTION ENGINE

(75) Inventors: Yasushi Noda, Yokohama (JP); Shigekazu Fuji, Yokohama (JP); Masashi Hosoya, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/960,501

(22) Filed: Oct. 8, 2004

(65) Prior Publication Data

US 2005/0076891 A1 Apr. 14, 2005

(30) Foreign Application Priority Data

Oct. 10, 2003 (JP) .............................. 2003-351575

(51) Int. Cl.
*F01M 13/00* (2006.01)
(52) U.S. Cl. .................................. 123/572; 123/568.15
(58) Field of Classification Search ........ 123/572–574, 123/41.86, 568.11–568.32
See application file for complete search history.

(56) References Cited

U.S. PATENT DOCUMENTS

| 6,422,221 B2 | 7/2002 | Pietrowski et al. |
| 6,457,462 B2 * | 10/2002 | Moren .......................... 123/572 |
| 6,553,978 B2 * | 4/2003 | Takashiba ............... 123/568.15 |
| 6,695,658 B1 * | 2/2004 | Muramatsu ................ 440/88 L |
| 6,722,129 B2 * | 4/2004 | Criddle et al. .............. 60/605.2 |
| 6,729,316 B1 * | 5/2004 | Knowles ...................... 123/572 |
| 2002/0046743 A1 * | 4/2002 | Moren .......................... 123/572 |

FOREIGN PATENT DOCUMENTS

| JP | 57-136853 U | 2/1981 |
| JP | 6-288305 A | 10/1994 |
| JP | 2000-274223 A | 10/2000 |
| JP | 2001-241367 A | 9/2001 |
| JP | 2002-339809 A | 11/2002 |

* cited by examiner

*Primary Examiner*—Marguerite McMahon
(74) *Attorney, Agent, or Firm*—Foley & Lardner LLP (57) ABSTRACT

According to one exemplary embodiment of the present invention, there is provided an intake device of an internal combustion engine, having a plurality of intake passages for introducing an intake gas into a row of engine cylinders, respectively; and a secondary gas passage for introducing a secondary gas into the intake passages. The secondary gas passage includes a main gas channel, an adjacent gas channel extending downstream from the main gas channel adjacently and substantially in parallel with the main gas channel, and branch gas channels branching off from the adjacent gas channel and continuing to the intake passages.

14 Claims, 14 Drawing Sheets

PRIOR ART

INTAKE DEVICE OF INTERNAL COMBUSTION ENGINE

BACKGROUND OF THE INVENTION

The present invention relates to a device for introducing a secondary gas, including but not limited to blowby gas, EGR gas and/or secondary air, into the intake of an internal combustion engine, and more particularly to a technique for preventing the overcooling and freezing of the secondary gas.

There is proposed an intake device of an internal combustion engine, having a gas passage for recirculating/adding a secondary gas (such as blowby gas, EGR gas or secondary air) to engine intake for exhaust gas purification or idle control. In the above proposed intake device, it is desired that the secondary gas be prevented from becoming overcooled and frozen even under cold engine conditions or under cold climate conditions. Especially when used in an in-line multi-cylinder internal combustion engine that is horizontally mounted on a vehicle with its intake situated toward a vehicle front side and its exhaust situated toward a vehicle rear side, at least part of the secondary gas passage lies on the engine intake side, i.e., the vehicle front side. The secondary gas thus tends to get cooled under the influence of a driving wind blowing from the vehicle front side. In order to solve this problem, Japanese Laid-Open Patent Publication No. 2000-274223 proposes the arrangement of the secondary gas passage partly adjacent to an engine coolant line so as to prevent the overcooling of the secondary gas by heat conduction from the engine coolant line to the secondary gas passage.

SUMMARY OF THE INVENTION

In general, the multi-cylinder engine has intake ports formed in its cylinder head for connection to the respective engine cylinders and an intake manifold with intake branches connected to the intake ports. In the case of intake control valves being disposed in the intake branches or intake ports, it is conceivable that the secondary gas passage be branched to communicate with the respective intake branches or intake ports at positions downstream of the intake control valves and thereby protect the intake control valves from fouling and adhesion due to the secondary gas. In this case, however, the flow of the secondary gas in each branch of the secondary gas passage and the cross sectional area of each branch of the secondary gas passage become small to readily cause temperature decreases in the secondary gas. As a result, the overcooling and freezing of the secondary gas is more likely to occur in the branches of the secondary gas passage.

It is therefore an object of the present invention to provide a device for introducing a secondary gas into the intake of an internal combustion engine through a secondary gas passage while preventing the overcooling and freezing of the secondary gas effectively even in branches of the secondary gas passage.

According to one aspect of the invention, there is provided an intake device of an internal combustion engine, comprising: a plurality of intake passages for introducing an intake gas into a row of engine cylinders, respectively; and a secondary gas passage for introducing a secondary gas into the intake passages, the secondary gas passage including a main gas channel, an adjacent gas channel extending downstream from the main gas channel adjacently and substantially in parallel with the main gas channel, and branch gas channels branching off from the adjacent gas channel and connecting to the intake passages.

According to another aspect of the invention, there is provided an intake device of an internal combustion engine, comprising: intake manifold means for defining a plurality of intake passages for introducing an intake gas into a row of engine cylinders; gas passage means for defining a secondary gas passage for introducing a secondary gas into the intake passages, the secondary gas passage including upstream and downstream gas channels communicating with each other and branch gas channels branching off from the downstream gas channel into the intake passages; and heat conduction means for allowing heat conduction from the upstream gas channel to the downstream gas channel.

The other objects and features of the invention will also become understood from the following description.

DESCRIPTION OF THE EMBODIMENTS

The present invention will be described below by way of the following first to sixth embodiments. In the first to sixth embodiments, like parts and portions are designated by like reference numerals to omit repeated explanations thereof. Further, the terms "front", "rear", "left", "right" "upper", "lower", "inside" and "outside" are used relative to the normal orientation of a vehicle, and the terms "upstream" and "downstream" are used relative to the direction of gas flow through an internal combustion engine of the vehicle.

Internal combustion engine 10 according to the first embodiment of the present invention will be now explained with reference to FIGS. 1 to 8. For exemplary purposes, internal combustion engine 10 is herein designed as an in-line four-cylinder engine mounted horizontally in the engine room of a vehicle with its intake situated toward the front (indicated by an arrow Fr in FIG. 8) and its exhaust situated toward the rear. It is also assumed that a blowby gas recirculation apparatus is provided to recirculate blowby gas (leakage of gas compression past piston rings into an engine crankcase) to the intake of engine 10 via a known flow control valve (so called "blowby control valve") for exhaust gas purification although not shown in the drawings.

Figure 7:
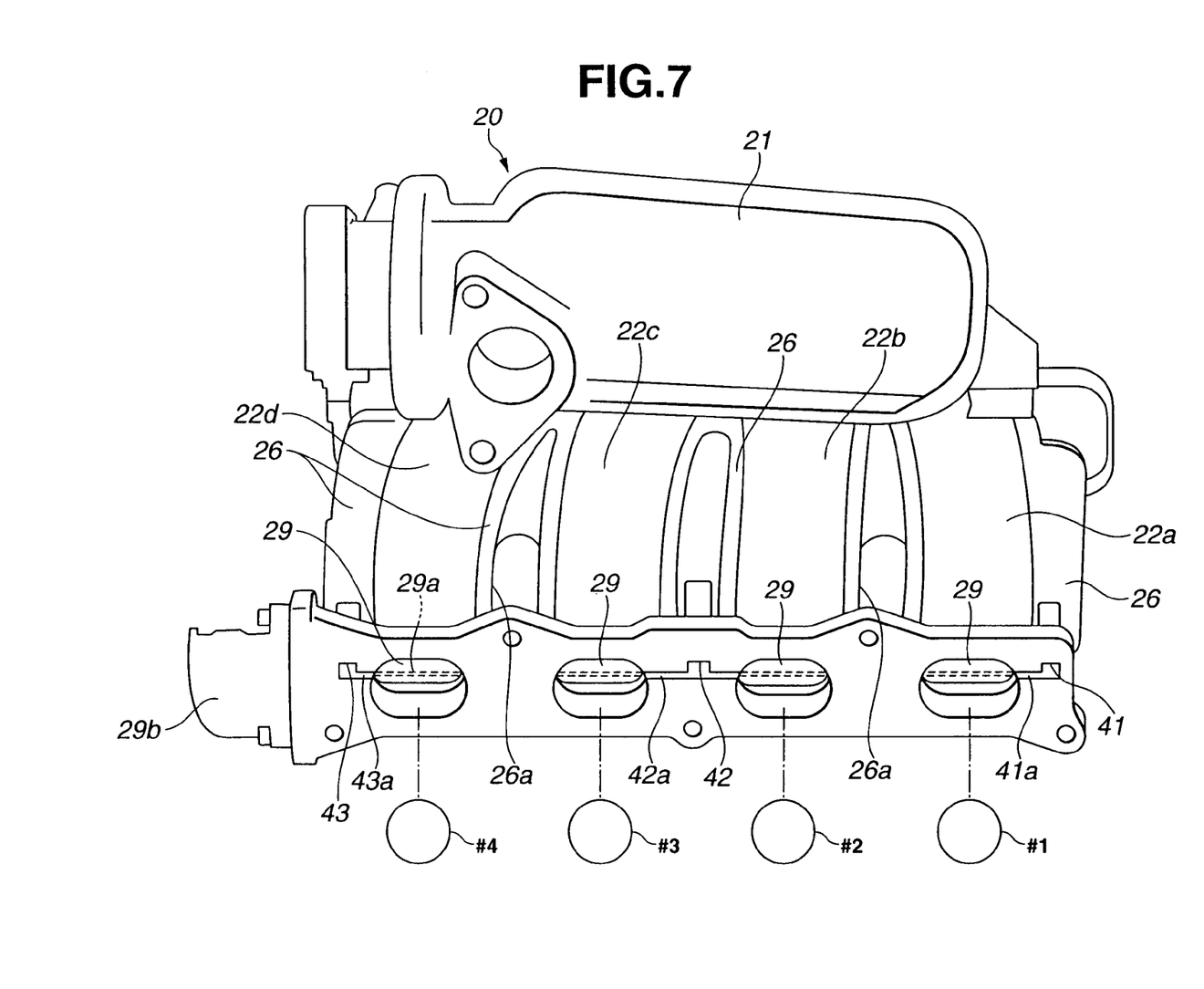
FIG. 7 is a vehicle rear side view of an intake manifold of the intake device of FIG. 1.
Figure 8:
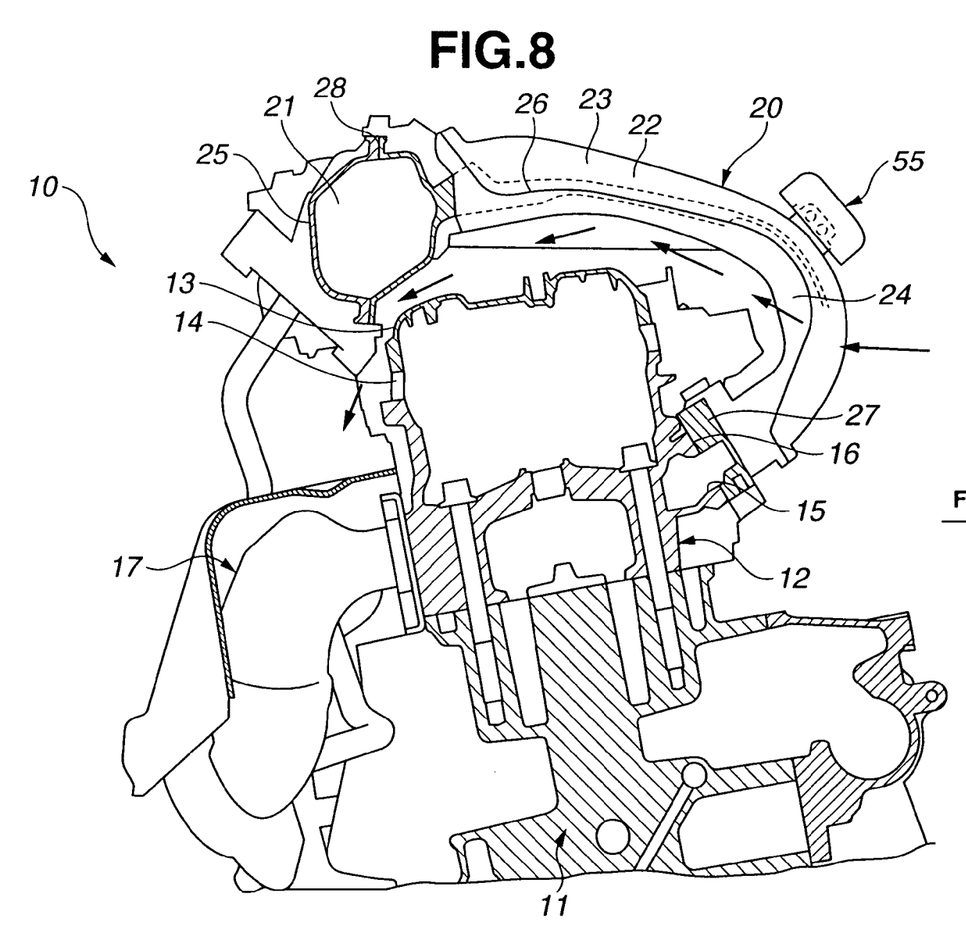
FIG. 8 is a sectional view of the internal combustion engine according to the first embodiment of the present invention.

Referring to FIGS. 7 and 8, internal combustion engine 10 includes cylinder block 11, cylinder head 12, rocker arm cover 13, cam bracket 14, intake manifold 20, tumble control valves (TCV) 29 with valve shaft 29a and TCV actuator 29b, exhaust manifold 17, gas passage unit 30, thermal insulator 51 and thermal insulation cover 52.

Cylinder block 11 and cylinder head 12 are fastened to each other so as to define a row of four engine cylinders #1 to #4 (numbered from right to left). Rocker arm cover 13 is attached to an upper side of cylinder head 12 with cam bracket 14 held between cylinder head 12 and rocker arm cover 13. Four intake ports 15 are formed in a front side of cylinder head 12 and opened in a row at manifold seat 16 to communicate with the combustion chambers of engine cylinders #1 to #4, respectively. Intake manifold 20 is provided with flange 27 and fixed to the front side of cylinder head 12 upon mating of flange 27 with manifold seat 16. Exhaust manifold 17 is fixed to the rear side of cylinder head 12 in which exhaust ports (not shown) are formed.

Figure 1:
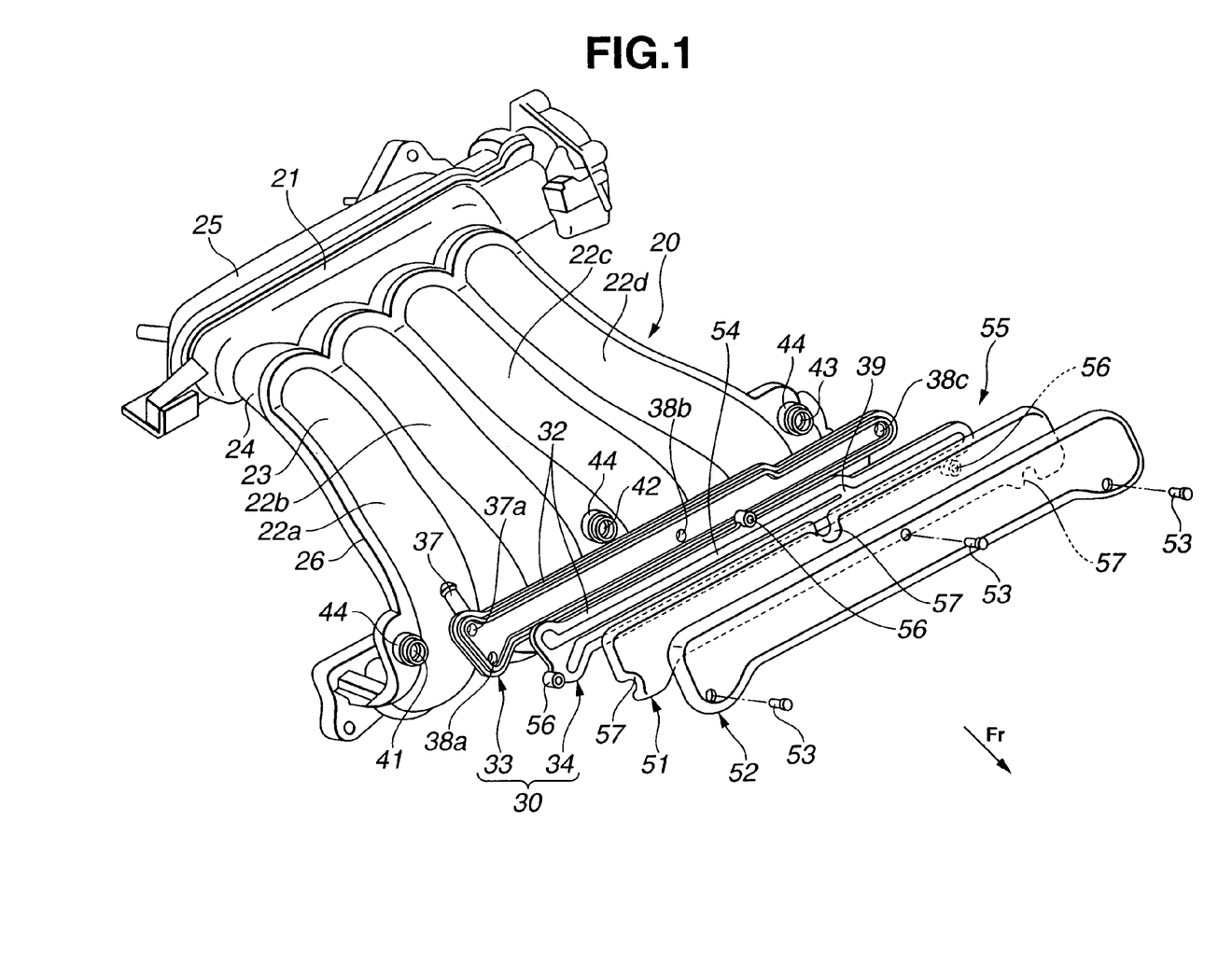
FIG. 1 is a partially exploded perspective view of an intake device of an internal combustion engine according to a first embodiment of the present invention.

Intake manifold 20 has intake collector 21 at an upstream end thereof and a row of four intake branches 22a to 22d branching off from intake collector 21 as shown in FIGS. 1 and 7. Intake collector 21 lies on a substantially upper side of rocker arm cover 13, and intake branches 22a to 22d extend from intake collector 21 to intake ports 15 in a curve so as to cover an upper front side of engine 10.

As shown in FIGS. 1 and 8, intake manifold 20 is formed from three structural manifold parts 23, 24 and 25 of low-priced lightweight resinous material. First and second manifold parts 23 and 24 are arranged on engine outer and inner sides, respectively, and joined together at flanged mating portions 26 thereof to define intake branches 22a to 22d along mating portions 26. Third manifold part 25 is arranged on an upstream end of manifold part 24, and second and third manifold parts 24 and 25 are joined together at mating portions 28 thereof to define intake collector 21 along mating portions 28. Further, manifold flange 27 is formed on a downstream end of second manifold part 24.

Intake passages are formed through intake branches 22a to 22d to connect intake collector 21 with intake ports 15, respectively, for the introduction of an intake gas (air and fuel) into engine cylinders #1 to #4 as shown in FIG. 7. TCV 29 are disposed in intake branches 22a to 22d and driven by TCV actuator 29b through common valve shaft 29a in such a manner as to e.g. partly close the intake passages and thereby control a tumble flow of intake gas for improvement in combustion stability. Although not shown in the drawings, intake ports 15, located on the downstream side of TCV 29, have partition walls to divide the insides of intake ports 15 into portions shielded and not shielded by TCV 29.

Also, a blowby gas passage is formed through intake manifold 20 and gas passage unit 30 for the introduction of blowby gas (as a secondary gas) into the intake passages of intake manifold 20. The blowby gas passage includes main gas channel 35, adjacent gas channel 36 extending downstream from main gas channel 35 adjacently and substantially in parallel with main gas channel 35, and branch gas channels 41, 42 and 43 branching off from adjacent gas channel 36.

Figure 6:
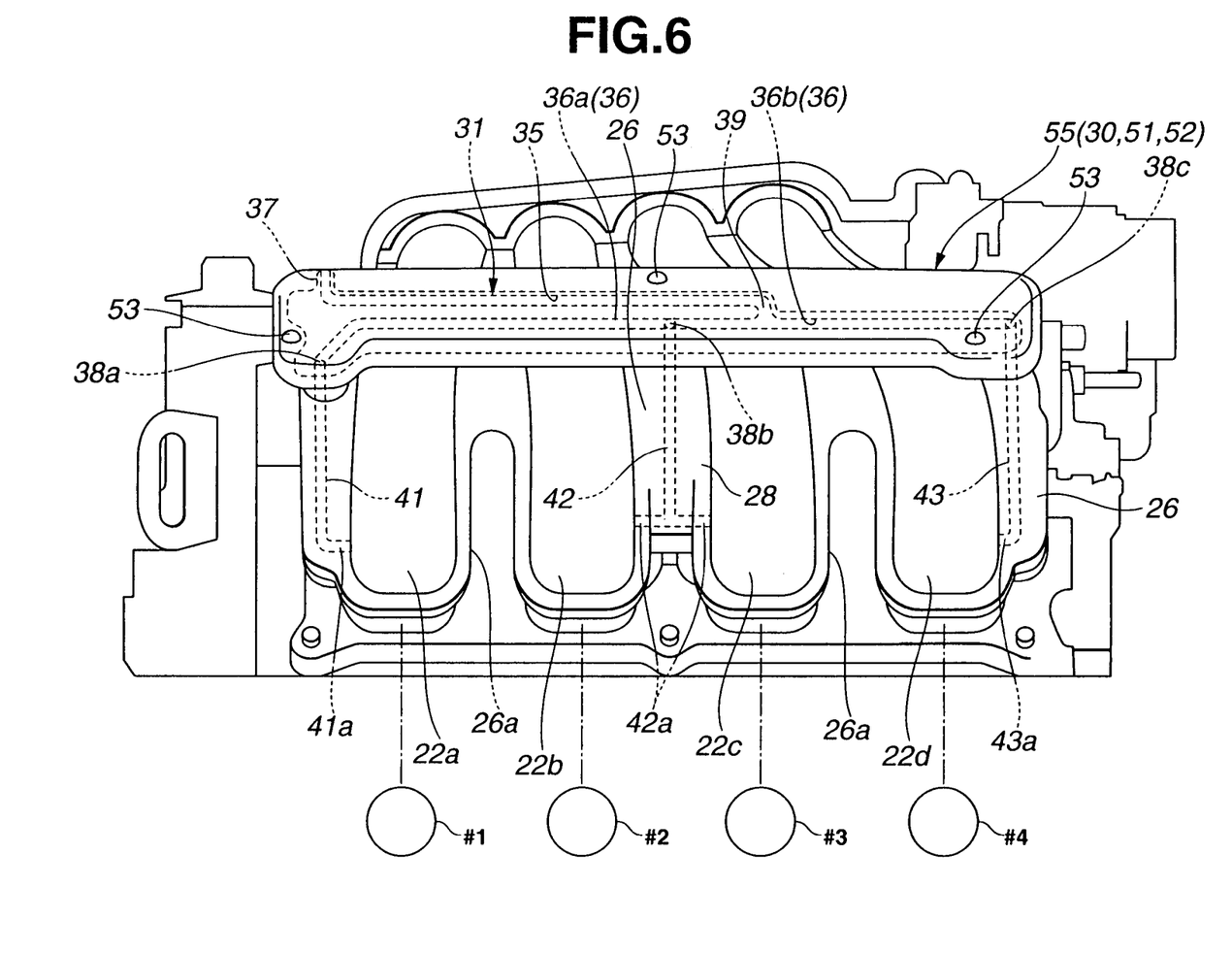
FIG. 6 is a vehicle front side view of the intake device of FIG. 1.

In the first embodiment, branch gas channels 41, 42 and 43 are formed through manifold mating portions 26 with gas inlets opened at three manifold boss portions 44 and gas outlets 41a, 42a and 43a opened at the intake passages of intake branches 22a to 22d as shown in FIGS. 6 and 7. Branch gas channels 41 and 43 communicate with the intake passages of intake branches 22a and 22d via gas outlets 41a and 43a, respectively. Branch gas channel 42 between branch gas channels 41 and 43 is branched to communicate with the intake passages of intake branches 22b and 22c via gas outlets 42a. In order to prevent TCV 29 from becoming fouled and adhered due to the blowby gas, gas outlets 41a, 42a and 43a are formed at positions downstream of TCV 29 (i.e. in the combustion chamber side). Branch gas channels 41, 42 and 43 may alternatively have gas outlets 41a, 42a and 43a opened at intake ports 15.

Herein, manifold mating portions 26 have recesses preformed to define branch gas channels 41, 42 and 43 upon mating of first and second manifold parts 23 and 24. Similarly, manifold flange 27 has hollows preformed to define gas outlets 41a, 42a and 43a upon mating of manifold flange 27 with manifold seat 16. This allows easier molding of intake manifold 20 with branch gas channels 41, 42 and 43.

As shown in FIG. 6, open edges 26a are formed in some portions of intake manifold 20 through which branch gas channels 41, 42 and 43 do not pass, i.e., in manifold mating portions 26 between intake branches 22a and 22b and between intake branches 22c and 22d, in order to achieve weight reduction and let a driving wind flow to the exhaust side.

Figure 2:
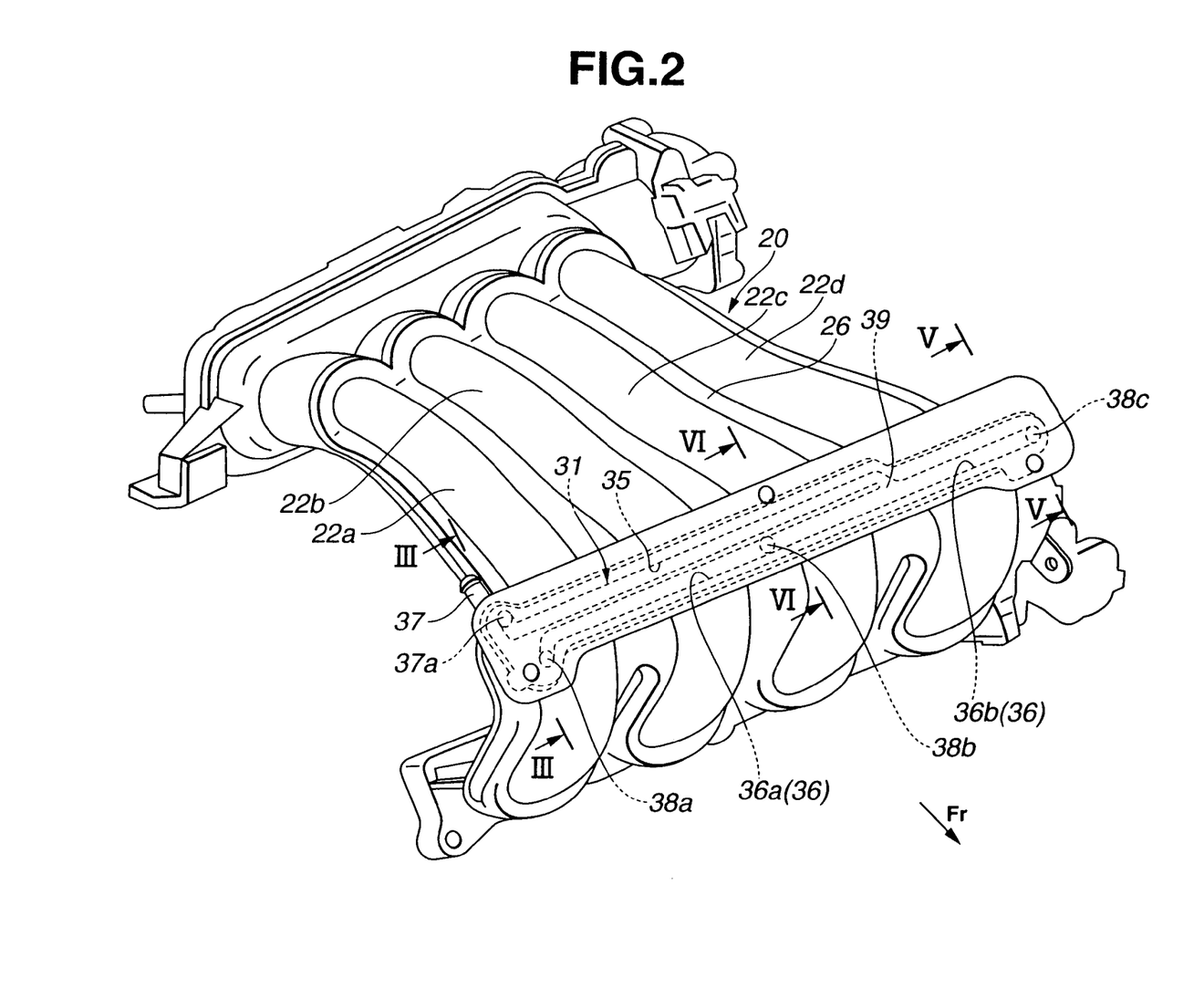
FIG. 2 is a perspective view of the intake device of FIG. 1.

Main gas channel 35 and adjacent gas channel 36 are formed through gas passage unit 30, as shown in FIGS. 2 and 6, in the first embodiment. (The sequence of main gas channel 35 and adjacent gas channel 36 in gas passage unit 30 is herein referred to as "blowby gas supply passageway 31".)

Figure 3:
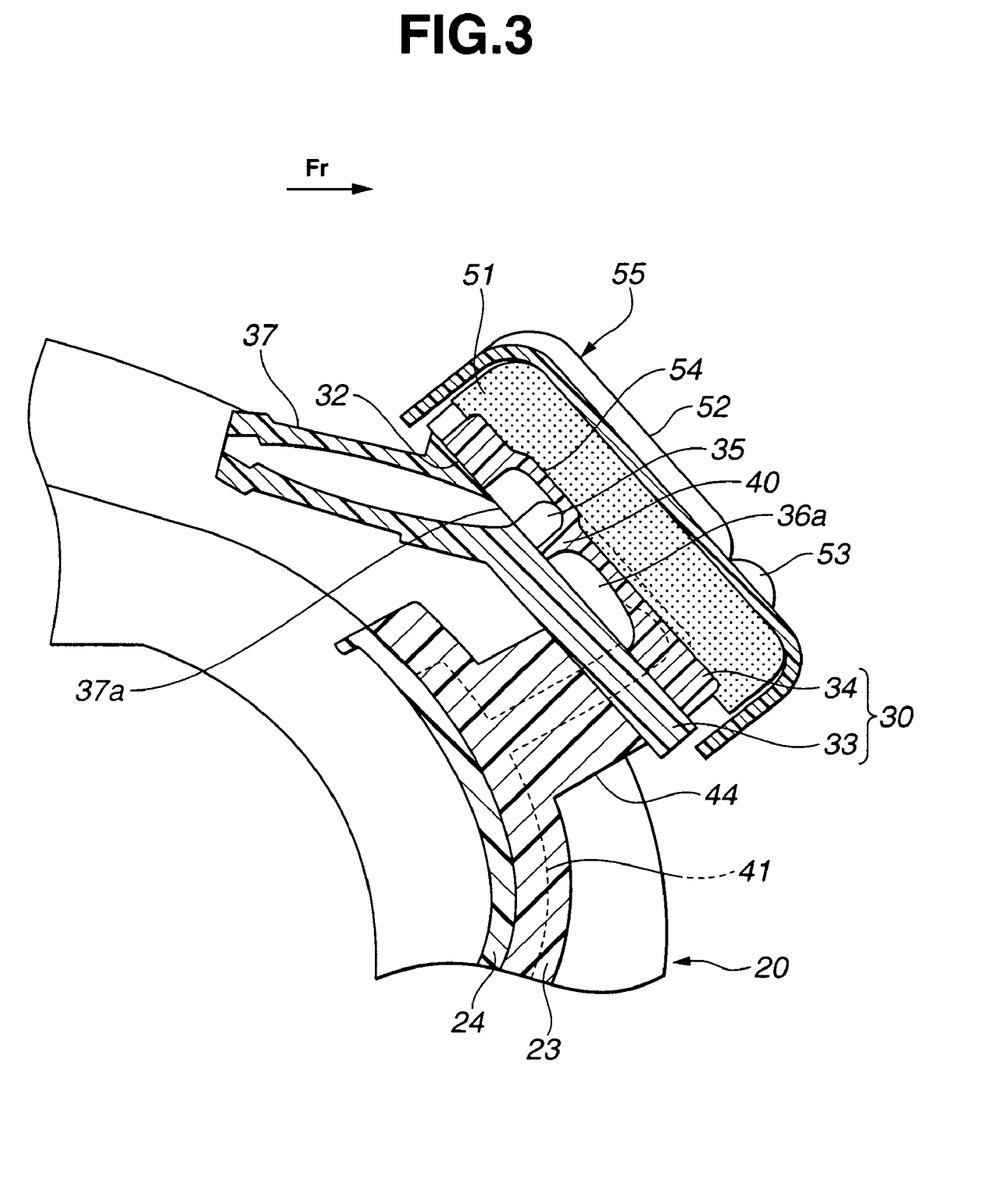
FIG. 3 is a sectional view of the intake device when taken along a line III—III of FIG. 2.

Gas passage unit 30 has a substantially planular shape and is mounted on intake manifold 20 by means of manifold boss portions 44 so as to cross over intake branches 22a to 22d. Further, gas passage unit 30 is formed from a pair of structural plate parts 33 and 34 of low-priced lightweight resinous material as shown in FIGS. 1 and 3. First and second plate parts 33 and 34 are arranged on engine inner and outer sides, respectively, and welded together at flanged mating edges thereof. First plate part 33 (located nearer to intake manifold 20) has gas pipe 37 formed with pipe opening 37a at one end thereof adjacent to intake branch 22a and connected to the blowby gas recirculation apparatus via a gas line (not shown). Second plate part 34 (located farther from intake manifold 20) has a recess preformed with strip-shaped thin partition wall 40 to define main gas channel 35 and adjacent gas channel 36 upon joining of plate parts 33 and 34. This also allows easier molding of gas passage unit 30 with blowby gas supply passageway 31.

Main gas channel 35 is connected with gas pipe 37 through pipe opening 37a and extends straight in a longitudinal direction of gas passage unit 30, i.e., in a direction of the row of engine cylinders #1 to #4. Adjacent gas channel 36 is divided into two gas channel sections 36a and 36b at junction 39 between main gas channel 35 and adjacent gas channel 36 in such a manner that gas channel sections 36a and 36b extend into opposite directions substantially in parallel with main gas channel 35. Gas channel section 36a is returned toward an upstream end of main gas channel 35 so that main gas channel 35 and gas channel section 36a are adjacent to each other on opposite sides of partition wall 40. Further, adjacent gas channel 36 has openings 38a, 38b and 38c for the distribution of blowby gas into branch gas channels 41, 42 and 43 as shown in FIG. 6. Gas distribution opening 38a is formed on gas channel section 36a at a position adjacent to intake branch 22a (farther from intake branch 22b) and connected with the gas inlet of branch gas channel 41. Gas distribution opening 38b is formed on gas channel section 36a at a position between intake branches 22b and 22c and connected with the gas inlet of branch gas channel 42. Gas distribution opening 38c is formed on gas channel section 36b at a position adjacent to intake branch 22d (farther from intake branch 22c) and connected with the gas inlet of branch gas channel 43. In the first embodiment, first plate part 33 is welded at openings 38a, 38b and 38c to manifold boss portions 44.

Thermal insulator 51 is made of a material having high thermal insulating efficiency (heat shielding efficiency), such as a foamed material or sponge, and arranged on gas passage unit 30 so as to cover substantially the whole of outer front surface 54 of gas passage unit 30.

Thermal insulation cover 52 is made of a resinous material and fixed to gas passage unit 30 by three bolts 53 (or any other fixing means, such as rivets) with thermal insulator 51 held between gas passage unit 30 and thermal insulation cover 52 under compression, thereby securing thermal insulator 51 to gas passage unit 30.

Figure 4:
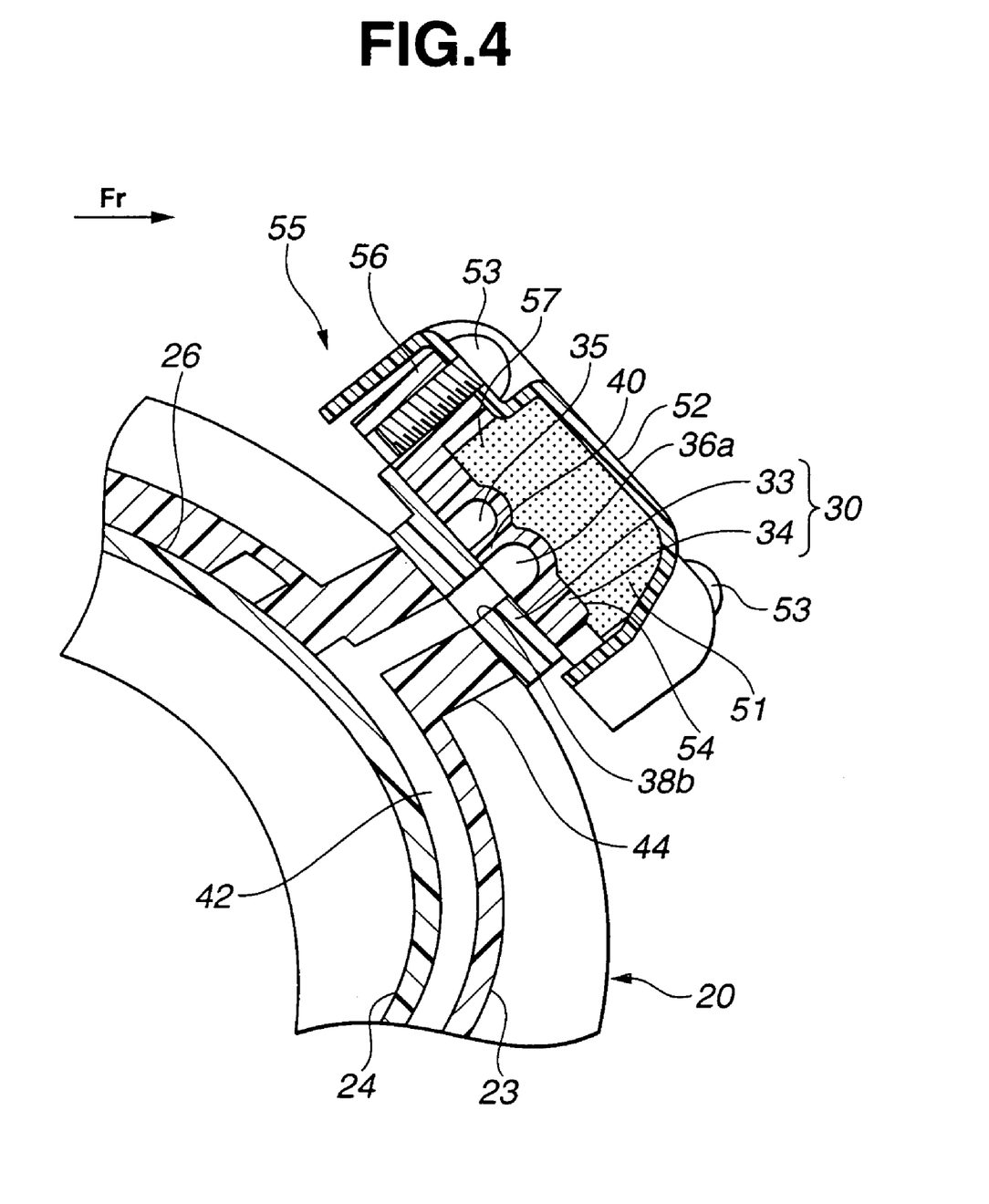
FIG. 4 is a sectional view of the intake device when taken along a line IV—IV of FIG. 2.
Figure 5:
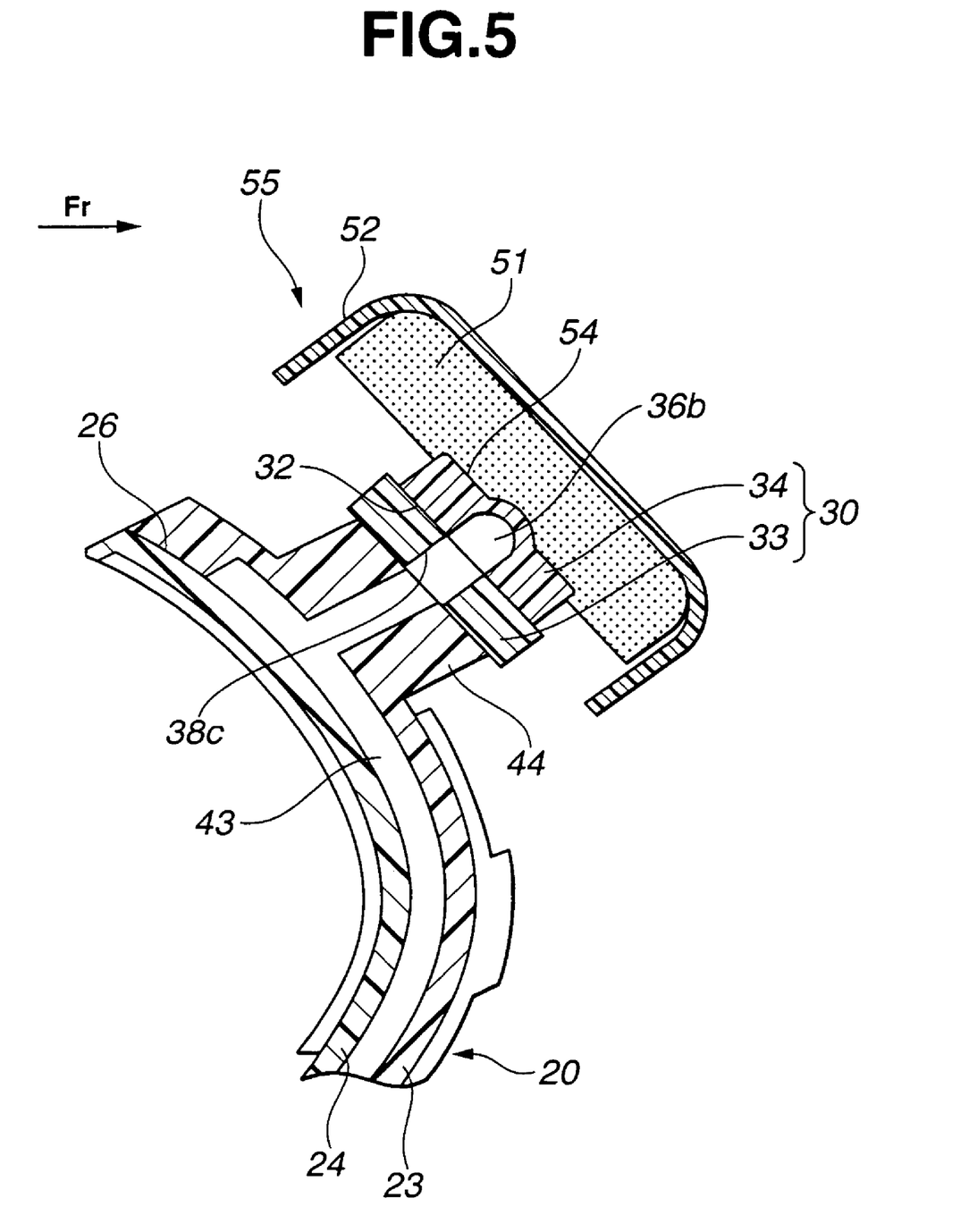
FIG. 5 is a sectional view of the intake device when taken along a line V—V of FIG. 2.

These gas passage unit 30, thermal insulator 51 and thermal insulation cover 52 can be easily mounted by laminating them into compact subassembly 55 and then fixing subassembly 55 onto intake manifold 20. As shown in FIGS. 1 and 4, second plate part 34 is integrally formed with three bosses 56 in which bolts 53 are screwed, and thermal insulator 51 are formed with three recesses 57 so as to avoid interference with bosses 56.

When internal combustion engine 10 is horizontally mounted on the vehicle with intake manifold 20 situtated toward the front and gas passage unit 30 fixed to the downstream side of intake manifold 20 overhanging toward the front as described above, most of the blowby gas passage lies on the vehicle front side. Thus, the temperature of the blowby gas in the blowby gas passage is largely affected by e.g. a driving wind blowing from the vehicle front side.

Figure 14:
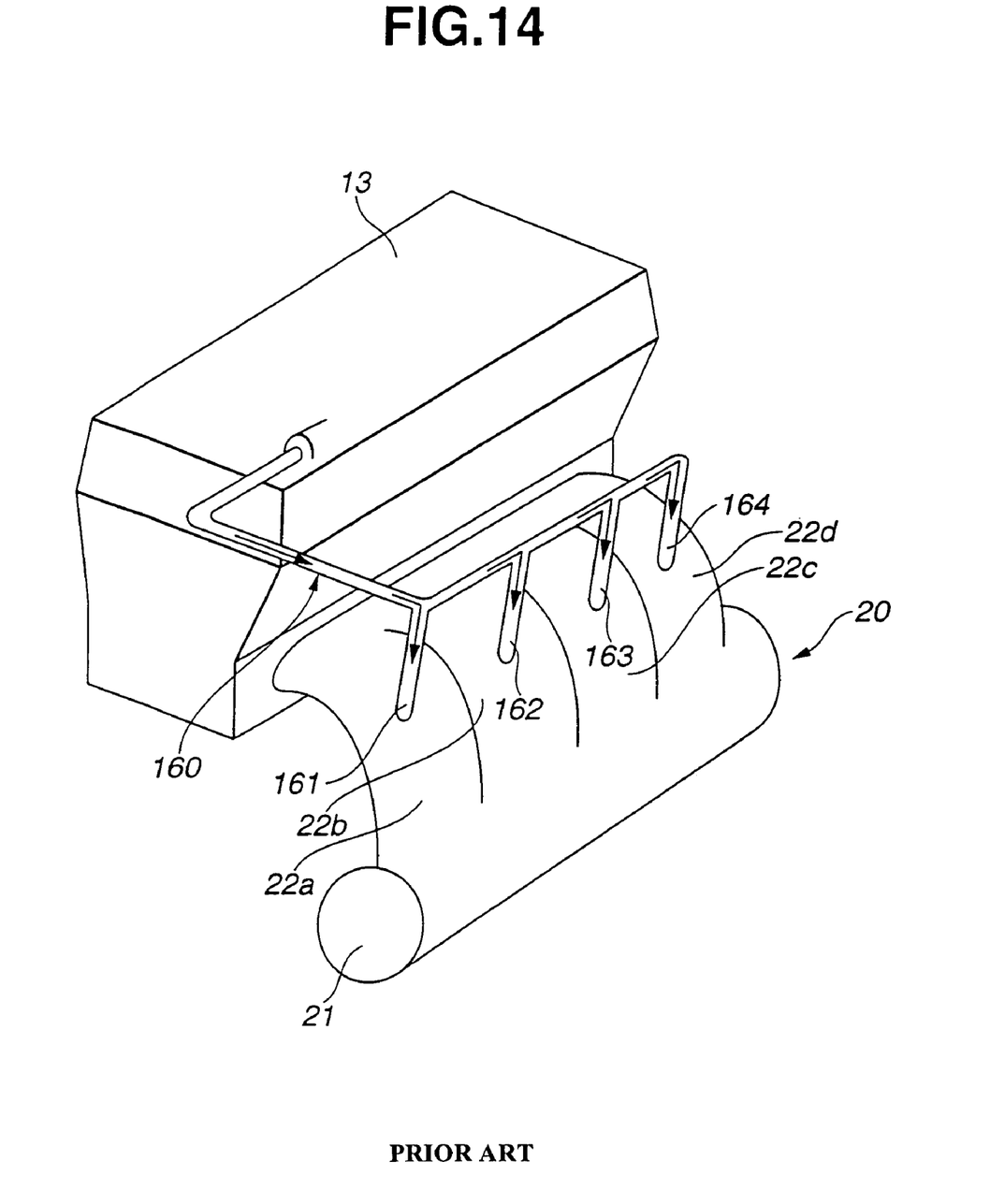
FIG. 14 is a schematic perspective view of an intake device of an internal combustion engine according to the earlier technology.

In the blowby gas passage of the earlier technology, branch gas channels 161 to 164 directly branch off from main gas channel 160, as shown in FIG. 14, in such a manner that the flow of blowby gas is first diverted from main gas channel 160 into branch gas channel 61, then branch gas channel 62, then branch gas channel 163, and then into branch gas channel 164. As branch gas channel 64 is located on the most downstream side of the blowby gas passage, the flow amount of the blowby gas in branch gas channel 64 is small. The overcooling and freezing of the blowby gas is particularly likely to occur in branch gas channel 164.

On the other hand, adjacent gas channel section 36a is provided adjacent to main gas channel 35 in which the temperature and heat capacity are higher in the first embodiment. Heat is thus conducted from main gas channel 35 to adjacent gas channel 36 through partition wall 40 so as to limit temperature decreases in the blowby gas in blowby gas supply passageway 31. The downstream end of adjacent gas channel section 36a and branch gas channel 41 continued therefrom are located farthest from main gas channel 35, and the flow amount of the blowby gas in the downstream end of the gas channel section 36a and branch gas channel 41 is small. Although the temperature of the blowby gas tends to get decreased notably in such a most downstream part of the blowby gas passage, the downstream end of gas channel section 36a is arranged adjacent to the upstream end of main gas channel 35 in which the temperature and heat capacity are relatively high. This makes it possible to possible to prevent the overcooling and freezing of the blowby gas even in the most downstream part of the blowby gas passage.

For not only the prevention of overcooling and freezing of the blowby gas but also the shortening of blowby gas supply passageway 31, the junction 39 of main gas channel 35 and adjacent gas channel 36 is formed at a position between gas distribution openings 38b and 38c farther from gas introduction opening 37a so that gas channel section 36a is longer than gas channel section 36b.

In view of the engine layout, the intake passages of intake branches 22b and 22c are located in the middle of the row of engine cylinders #1 to #4. The blowby gas thus tends to get cooled and frozen on its way to these intake passages of intake branches 22b and 22c. However, branch gas channel 42 provides shared access to the intake passages of intake branches 22b and 22c so as to increase the blowby gas flow amount in branch gas channel 42 as well as the cross sectional area of branch gas channel 42. In addition, branch gas channel 42 is branched at a position close to gas outlets 42a (i.e. at a position just before the connection of branch gas channel 42 to the intake passages of intake branches 22b and 22c) so as to shorten each branch of gas channel 42 where the blowby gas flow amount becomes small. This also makes it possible to prevent the overcooling and freezing of the blowby gas effectively and assuredly.

Further, the front outer surface 54 of gas passage unit 30 is thermally protected by thermal insulator 51 and thermal insulation cover 52. If front outer surface 54 of gas passage unit 30 is uncovered, gas passage unit 30 becomes directly exposed to the vehicle driving wind to thereby cause temperature decreases in the blowby gas in blowby gas supply passageway 31. In the first embodiment, however, the overcooling and freezing of the blowby gas can be thus prevented more effectively and assuredly by means of thermal insulator 51 and thermal insulation cover 52. It has been proved by actual measurement that the temperature in blowby gas supply passage 31 can be kept about 5° C. higher with the use of thermal insulator 51 than that without the use of thermal insulator 51.

Figure 9:
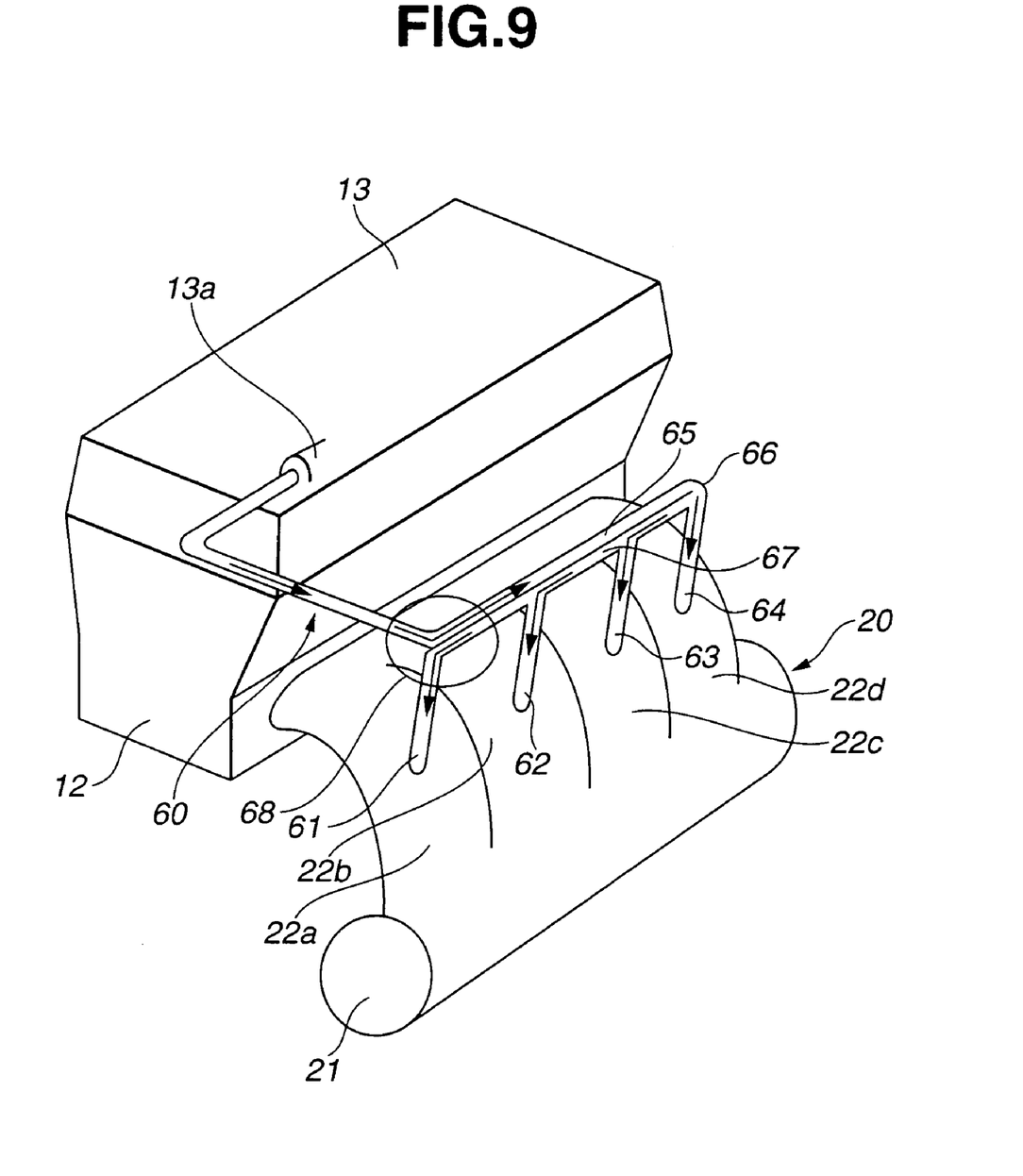
FIG. 9 is a schematic perspective view of an intake device of an internal combustion engine according to a second embodiment of the present invention.

The second embodiment will be next explained with reference to FIG. 9. In the second embodiment, the blowby gas passage includes main gas channel 60, adjacent gas channel 67 and branch gas channels 61 to 64 as shown in FIG. 9.

Main gas channel 60 is connected to exit end 13a of rocker arm cover 13, and has straight gas channel section 65 extending straight in the direction of row of engine cylinders #1 to #4 to cross over intake branches 22a to 22d. Adjacent gas channel 67 extend from a downstream end 66 of straight gas channel section 65 toward an upstream end of straight gas channel section 65 adjacent to and substantially in parallel with straight gas channel section 65 so that the flow of the blowby gas is turned about 180 degrees, i.e., makes a U-turn at the junction of main gas channel 60 and adjacent gas channel 67. Branch gas channels 61 to 64 branch off from adjacent gas channel 67 and extend substantially at the right angle with respect to adjacent gas channel 67 into the intake passages of intake branches 22a to 22d, respectively.

As in the first embodiment, heat is conducted from straight gas channel section 65 of main gas channel 60 to adjacent gas channel 67 so as to limit temperature decreases in the blowby gas in the second embodiment. Although the overcooling and freezing of the blowby gas is more likely to occur in the most downstream part of the blowby gas passage, the downstream end of adjacent gas channel 67 continuing to most downstream branch gas channel 61 is arranged adjacent to the upstream end of straight gas channel section 65 of main gas channel 60 in which the temperature and heat capacity are relatively high as indicated in an encircled area 68 of FIG. 9. It is also possible in the second embodiment to prevent the overcooling and freezing of the blowby gas effectively and assuredly even in the most downstream part of the blowby gas passage.

Figure 10:
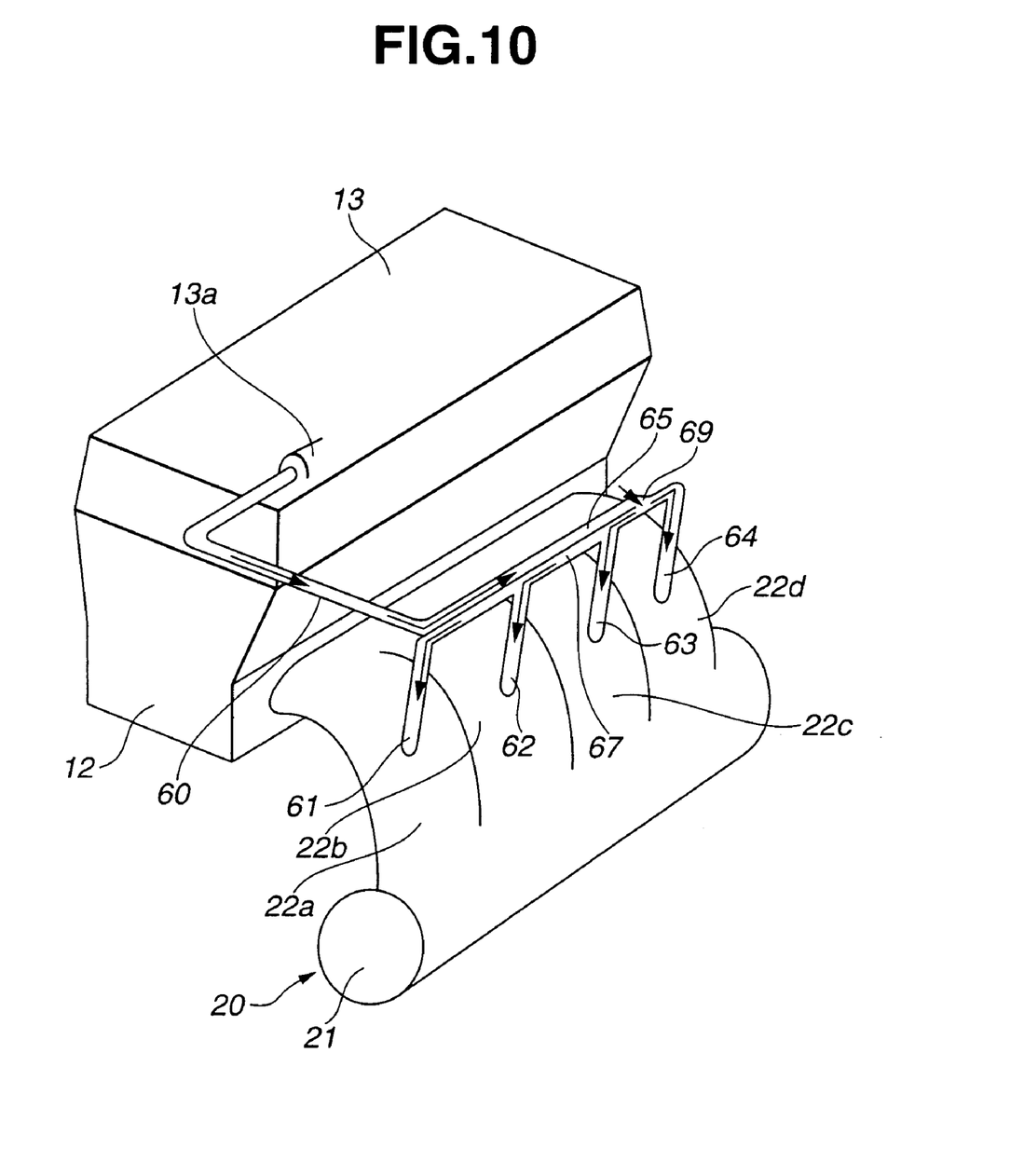
FIG. 10 is a schematic perspective view of an intake device of an internal combustion engine according to a third embodiment of the present invention.

The third embodiment will be explained with reference to FIG. 10. The third embodiment is structurally similar to the second embodiment, except that straight gas channel section 65 of main gas channel 60 ends at a position between branch gas channels 63 and 64 as shown in FIG. 10. The flow of the blowby gas thus bifurcates into two at junction 69 of main gas channel 60 and adjacent gas channel 67. This makes it possible to reduce flow resistance at junction 69 for the smooth flow of the blowby gas while preventing the overcooling and freezing of the blowby gas effectively and assuredly.

Figure 11:
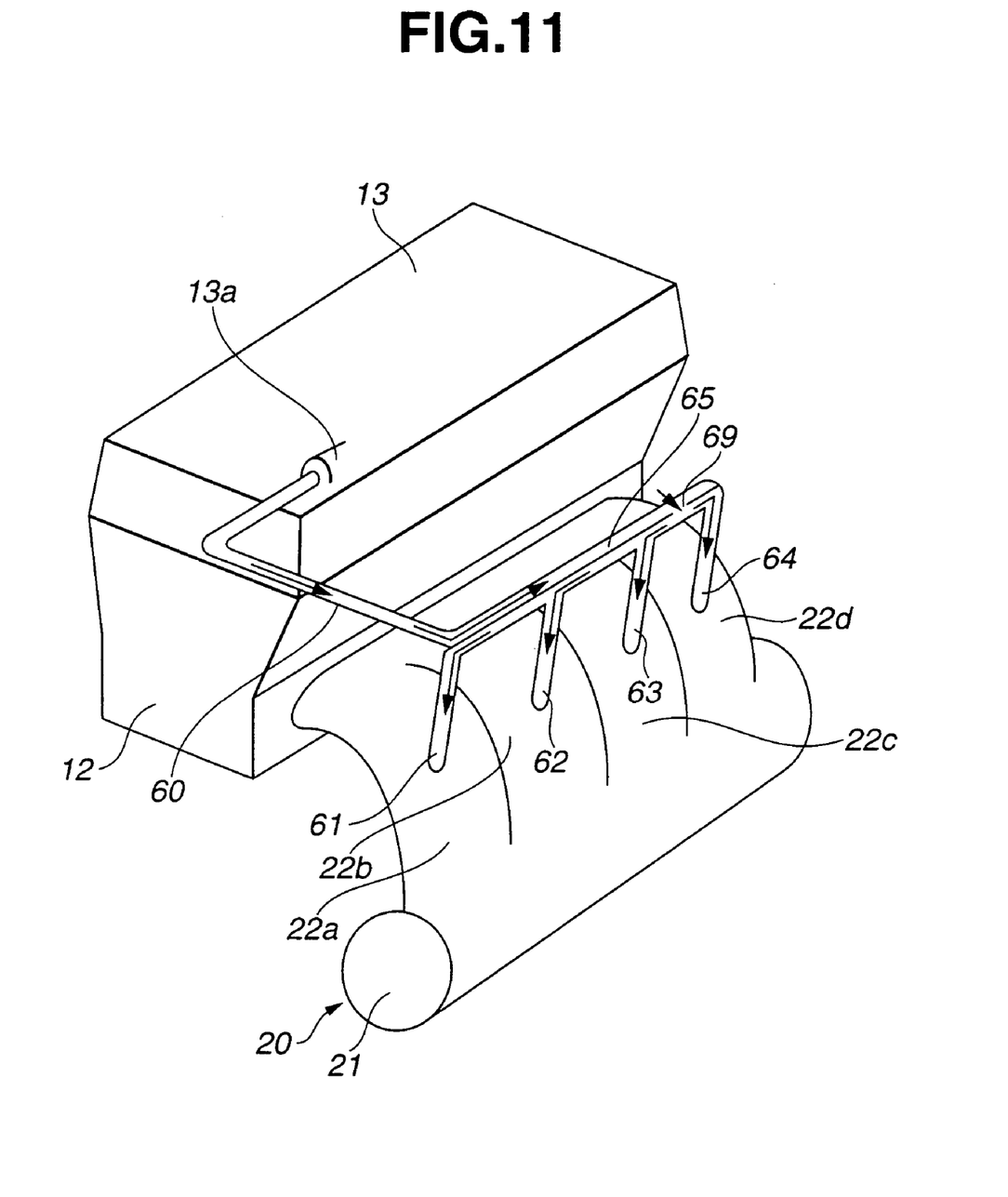
FIG. 11 is a schematic perspective view of an intake device of an internal combustion engine according to a fourth embodiment of the present invention.

The fourth embodiment will be explained with reference to FIG. 11. The fourth embodiment is structurally similar to the second and third embodiments, except that straight gas channel section 66 of main gas channel 60 extends to the end of adjacent gas channel 67 but communicates with adjacent gas channel 67 at a position between branch gas channels 63 and 64 as shown in FIG. 11. With such an arrangement, the length of adjacent gas channel 67 adjacent to straight gas channel section 66 can be increased. In addition, the flow of the blowby gas bifurcates into two at junction 69 of main gas channel 60 and adjacent gas channel 67 as in the second embodiment. This also makes it possible to reduce flow resistance at junction 69 for the smooth flow of the blowby gas while preventing the overcooling and freezing of the blowby gas effectively and assuredly.

Figure 12:
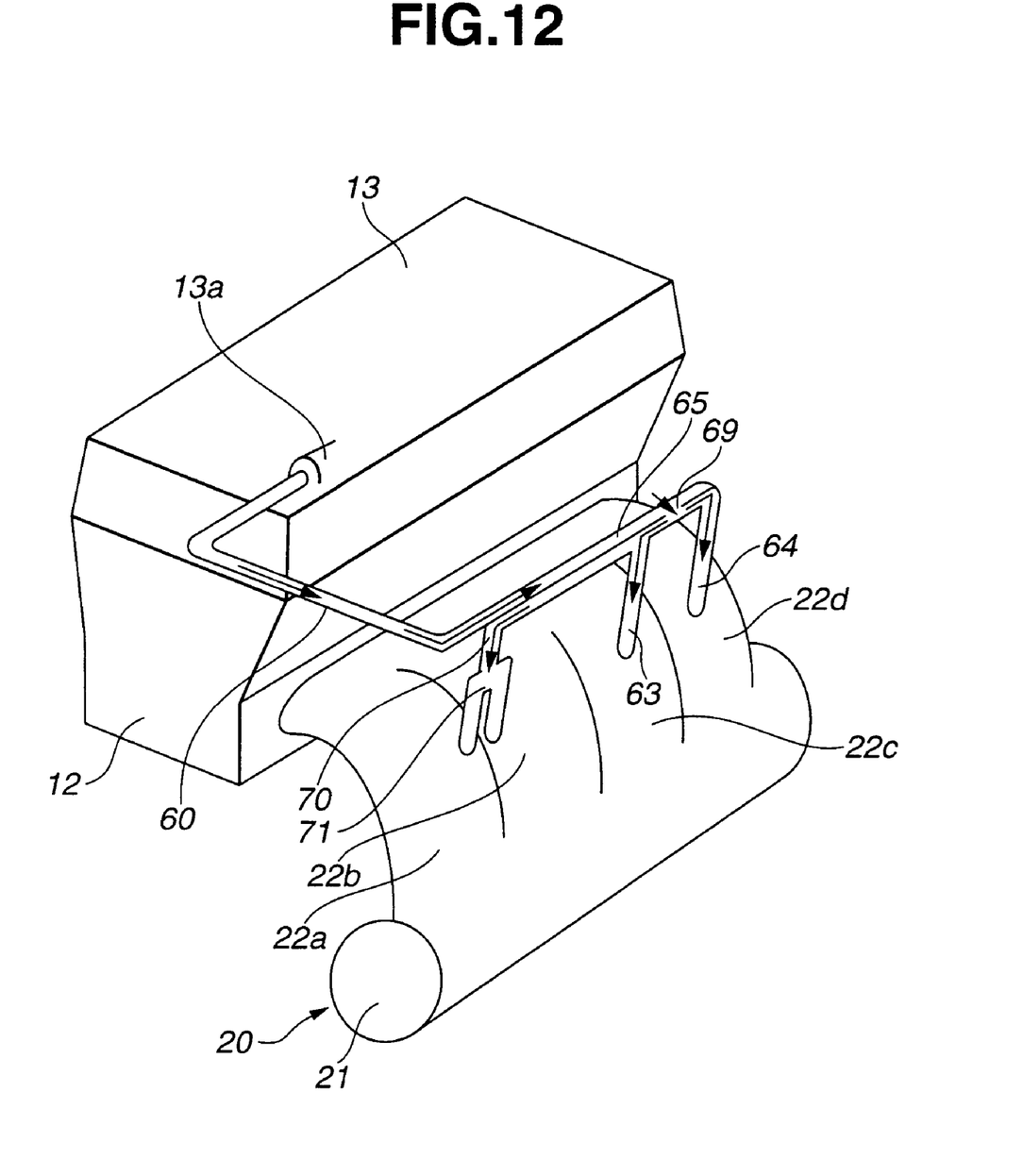
FIG. 12 is a schematic perspective view of an intake device of an internal combustion engine according to a fifth embodiment of the present invention.

The fifth embodiment will be explained with reference to FIG. 12. The fifth embodiment is structurally similar to the fourth embodiment, except that the blowby gas passage has common branch gas channel 70 extending from a downstream end of adjacent gas channel 67 and being branched to communicate with the intake passages of intake branches 22a and 22b as shown in FIG. 12. Although the blowby gas tends to get cooled in most downstream branch gas channel 77 as already mentioned above, branch gas channel 70 provides shared access to the intake passages of intake branches 22a and 22b so as to increase the flow amount of the blowby gas in branch gas channel 70 and the cross sectional area of branch gas channel 70. Further, common branch gas channel 70 is branched at position 71 just before the connection to the intake passages of intake branches 22a and 22b so as to shorten each branch of gas channel 70 where the blowby gas flow amount becomes small. This makes it possible to prevent the overcooling and freezing of the blowby gas more effectively and assuredly.

Figure 13:
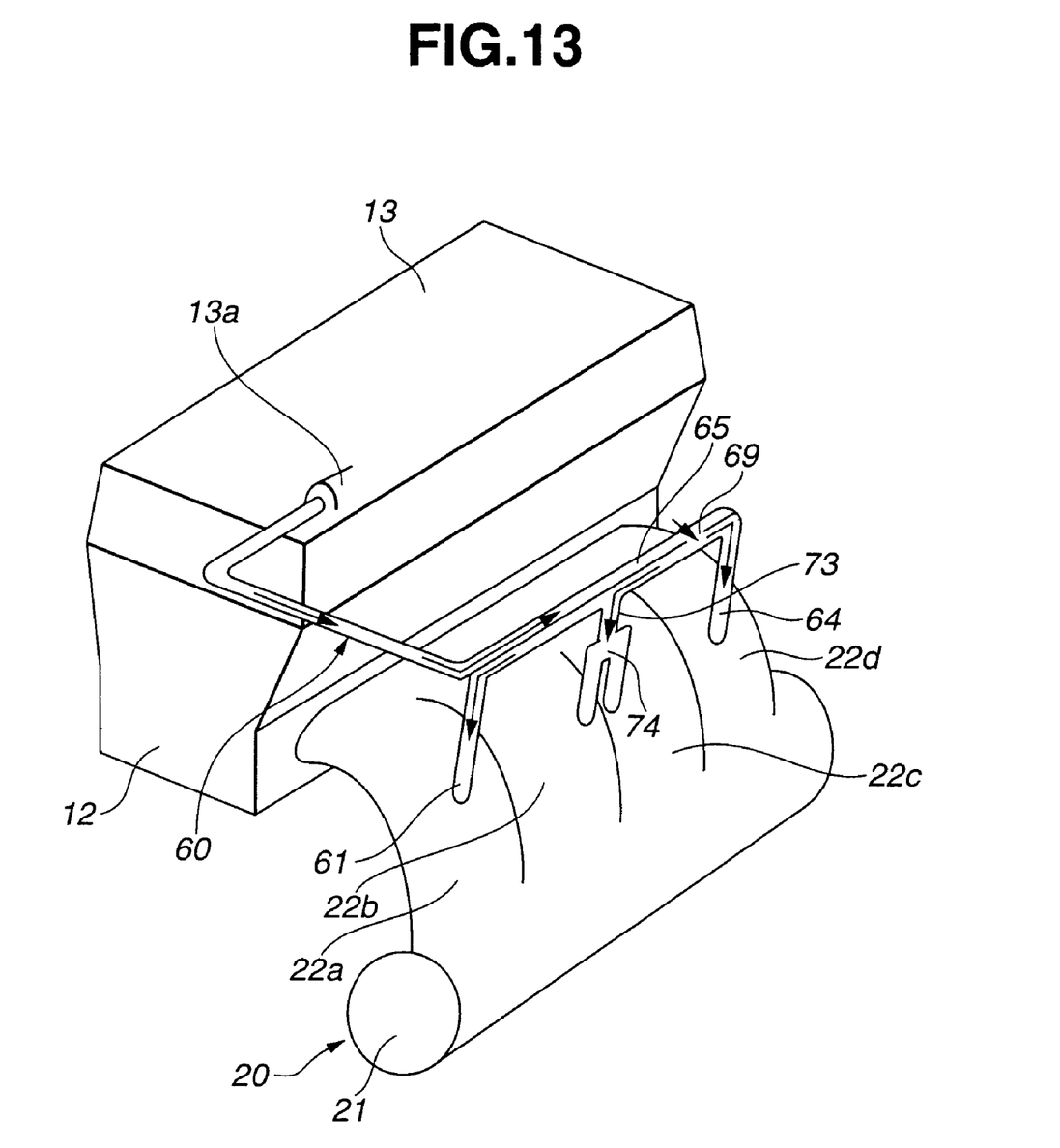
FIG. 13 is a schematic perspective view of an intake device of an internal combustion engine according to a sixth embodiment of the present invention.

The sixth embodiment will be explained with reference to FIG. 13. The sixth embodiment is structurally similar to the fourth embodiment, except that the blowby gas passage includes common branch gas channel 73 branched to communicate with the intake passages of two middle intake branches 22b and 22c as shown in FIG. 13. Although the blowby gas tends to get cooled in the intake passages of middle intake branches 22b and 22c in view of the engine layout as already mentioned above, branch gas channel 73 provides shared access to the intake passages of intake branches 22b and 22c so as to increase the blowby gas flow amount in branch gas channel 73 and the cross sectional area of branch gas channel 73. Further, branch gas channel 73 is branched at position 74 just before the connection to the intake passages of intake branches 22b and 22c so as to shorten each branch of gas channel 73 where the blowby gas flow amount becomes small. This also makes it possible to prevent the overcooling and freezing of the blowby gas more effectively and assuredly.

The entire contents of Japanese Patent Application No. 2003-351575 (filed on Oct. 10, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. For example, internal combustion engine 10 may alternatively be designed to reflux other secondary gas, such as EGR gas or secondary air, through gas passage 31. Intake manifold 20 may be made of another material, such as an aluminum alloy material. The number of cylinders is not particularly restricted, and engine 10 can alternatively be designed as e.g. an in-line six-cylinder engine. The scope of the invention is defined with reference to the following claims.

What is claimed is:

1. An intake device of an internal combustion engine, comprising:
   a plurality of intake passages for introducing an intake gas into a row of engine cylinders, respectively; and
   a secondary gas passage for introducing a secondary gas into the intake passages, the secondary gas passage including a main gas channel to allow a flow of said secondary gas to be distributed to all of said engine cylinders, an adjacent gas channel extending downstream from the main gas channel adjacently and substantially in parallel with the mairf gas channel and across the intake passages to allow a flow of said secondary gas to be distributed to fewer than all of said engine cylinders, and branch gas channels branching off from the adjacent gas channel and continuing to the intake passages, the branch gas channels including a common branch gas channel connected to at least two of the intake passages and being branched at a position just before the connection of the common branch gas channel to said at least two of the intake passages.

2. An intake device according to claim 1, the engine being horizontally mounted on a vehicle with an intake side of the engine situated toward a front side of the vehicle.

3. An intake device according to claim 1 said common branch gas channel being located farthest from the main gas channel.

4. An intake device according to claim 1, said common branch gas channel being located in the middle of the row of the engine cylinders.

5. An intake device according to claim 1, further comprising:
   an intake manifold having intake branches to define therein the intake passages, respectively; and
   a gas passage unit mounted on the intake manifold so as to cross over the intake branches, and having a pair of plate parts joined together to define therein the main gas channel and the adjacent gas channel.

6. An intake device according to claim 1, further comprising intake control valves disposed in the intake passages, the branch gas channels being connected to the intake passages at positions downstream of the intake control valves.

7. An intake device according to claim 1, the secondary gas being blowby gas.

8. An intake device of an internal combustion engine, comprising:

intake manifold means for defining first to fourth intake passages for introducing an intake gas into a row of engine cylinders;

gas passage means for defining a secondary gas passage for introducing a secondary gas into the first to fourth intake passages, the secondary gas passage including upstream and downstream gas channels communicating with each other at a junction thereof and branch gas channels branching off from the downstream gas channel into the intake passages; and heat conduction means for allowing heat conduction from the upstream gas channel to the downstream gas channel;

wherein the upstream gas channel has a first gas channel section extending from the first intake passage toward the fourth intake passage along a direction of the row of the engine cylinders; the downstream gas channel has a second gas channel section extending from said junction toward the first intake passage adjacently to and substantially in parallel with the first gas channel section and a third gas channel section extending from said junction toward the fourth intake passage in a direction opposite to the second gas channel section; said junction is located over a point between the third and fourth intake passages; and wherein said heat conduction means is a thin partition between the first and second gas channel sections.

9. An intake device according to claim 8, wherein said intake manifold means is mounted on a vehicle front side of the engine.

10. An intake device according to claim 8, wherein the first gas channel section extends to an end of the third gas channel section.

11. An intake device according to claim 8, wherein the second gas channel section is longer than the third gas channel section.

12. An intake device according to claim 8, wherein one of the branch gas channels is connected to a downstream end of the second gas channel section and branched to communicate with at least two of the intake passages.

13. An intake device according to claim 8, wherein one of the branch gas channels is located in the middle of the row of the engine cylinders and branched to communicate with at least two of the intake passages.

14. An intake device of an internal combustion engine, comprising:

an intake manifold defining a plurality of first to fourth intake passages for introducing an intake gas into a row of engine cylinders;

a gas passage assembly defining a secondary gas passage for introducing a secondary gas into the first to fourth intake passages, the secondary gas passage including upstream and downstream gas channels communicating with each other at a junction thereof and branch gas channels branching off from the downstream gas channel into the intake passages; and a heat conduction member for allowing heat conduction from the upstream gas channel to the downstream gas channel;

wherein the upstream and downstream gas channels have first and second gas channel sections, respectively, extending adjacent to and substantially in parallel with each other along a direction of the row of the engine cylinders on opposite sides of said heat conduction member;

wherein the upstream gas channel has a first gas channel section extending from the first intake passage toward the fourth intake passage along a direction of the row of the engine cylinders; the downstream gas channel has a second gas channel section extending from said junction toward the first intake passage adjacently to and substantially in parallel with the first gas channel section and a third gas channel section extending from said junction toward the fourth intake passage in a direction opposite to the second gas channel section; said junction is located over a point between the third and fourth intake passages; and wherein said heat conduction member comprises a thin partition between the first and second gas channel sections.

* * * * *